US012588039B2

United States Patent

(12) Belling et al.

(10) Patent No.: US 12,588,039 B2
(45) Date of Patent: Mar. 24, 2026

(54) HANDLING OF MULTICAST SESSIONS

(71) Applicant: Nokia Technologies Oy, Espoo (FI)

(72) Inventors: Horst Thomas Belling, Erding (DE); Philippe Godin, Versailles (FR)

(73) Assignee: Nokia Technologies Oy, Espoo (FI)

( * ) Notice: Subject to any disclaimer, the term of this patent is extended or adjusted under 35 U.S.C. 154(b) by 300 days.

(21) Appl. No.: 18/190,898

(22) Filed: Mar. 27, 2023

(65) Prior Publication Data

US 2023/0319853 A1 Oct. 5, 2023

(51) Int. Cl.
*H04W 72/30* (2023.01)

(52) U.S. Cl.
CPC .................................... *H04W 72/30* (2023.01)

(58) Field of Classification Search
CPC ... H04W 60/00; H04W 72/046; H04W 72/30; H04W 76/27; H04W 76/40
See application file for complete search history.

(56) References Cited

U.S. PATENT DOCUMENTS

| | | | | |
|---|---|---|---|---|
| 2024/0244711 | A1* | 7/2024 | Li | H04W 76/20 |
| 2024/0422861 | A1* | 12/2024 | Jia | H04W 76/40 |
| 2025/0024558 | A1* | 1/2025 | Ge | H04L 67/146 |
| 2025/0133578 | A1* | 4/2025 | Pham Van | H04L 12/189 |
| 2025/0168601 | A1* | 5/2025 | Chen | H04W 36/0007 |

FOREIGN PATENT DOCUMENTS

| | | | |
|---|---|---|---|
| WO | 2022/126359 | A1 | 6/2022 |
| WO | 2022/213001 | A1 | 10/2022 |
| WO | 2023/033629 | A1 | 3/2023 |

OTHER PUBLICATIONS

"3rd Generation Partnership Project; Technical Specification Group Services and System Aspects; Study on architectural enhancements for 5G multicast-broadcast services; Phase 2 (Release 18)", 3GPP TR 23.700-47, V0.1.0, Feb. 2022, pp. 1-17.
European Application No. 22165171.4, "Method, Apparatus and Computer Program", filed on Mar. 29, 2022, pp. 1-33.
"3rd Generation Partnership Project; Technical Specification Group Services and System Aspects; Architectural enhancements for 5G multicast-broadcast services; Stage 2 (Release 17)", 3GPP TS 23.247, V17.1.0, Dec. 2021, pp. 1-102.
"New SID: Architectural enhancements for 5G multicast-broadcast services Phase 2", TSG SA Meeting #SP-94E, SP-211645, Agenda: 9.1.3, Huawei, Dec. 14-20, 2021, pp. 1-5.
(Continued)

*Primary Examiner* — Awet Haile
(74) *Attorney, Agent, or Firm* — Nokia Technologies Oy

(57) ABSTRACT

There is provided an apparatus comprising means for performing: determining a presence of at least one user equipment that is participating in a multicast session while in an inactive state; determining an area where handling of the multicast session for the at least one user equipment in inactive state is required; determining one or more nodes handling cells within at least a part of the determined area for handling the multicast session; in response to the determining a presence of at least one user equipment in inactive state, sending to each determined node a request to handle the multicast session for the at least one user equipment in inactive state.

10 Claims, 11 Drawing Sheets

(56) References Cited

OTHER PUBLICATIONS

"3rd Generation Partnership Project; Technical Specification Group Radio Access Network; NR; NR and NG-RAN Overall Description; Stage 2 (Release 16)", 3GPP TS 38.300, V16.8.0, Dec. 2021, pp. 1-152.
"3rd Generation Partnership Project; Technical Specification Group Services and System Aspects; System architecture for the 5G System (5GS); Stage 2 (Release 17)", 3GPP TS 23.501, V17.3.0, Dec. 2021, pp. 1-559.
"Solution proposal for key issue 1 (inactive reception)", SA WG2 Meeting #151E, S2-2204803, Agenda: 9.18, Nokia, May 16-20, 2022, pp. 1-7.
Search Report received for corresponding United Kingdom Patent Application No. 2204462.2, dated Oct. 16, 2023, 5 pages.
"Discussion and proposal of RRC Inactive multicast MBS reception", 3GPP TSG-WG SA2 Meeting #149E e-meeting, S2-2200599, Agenda: 9.18, Huawei, Feb. 14-25, 2022, pp. 1-6.
Office Action received for corresponding United Kingdom Patent Application No. 2204462.2, dated Nov. 20, 2025, 6 pages.

* cited by examiner

102

104

106

| UE | NG-RAN 1 | | NG-RAN 2 |

S1    1. Detection that no more Inactive UE in multicast session are served.

S2    2. Multicast handling termination request, MBS session ID

S3    3. Check whether other RAN nodes requested handling of multicast Session, and whether served UEs in inactive state participate in multicast session S4    4. Termination of shared delivery towards RAN node (See clause 7.2.2.4 of TS 23.247)

S5    5. Stop Transmiting data for multicast session

S6    5. Stop Broadcasting Information about multicast session

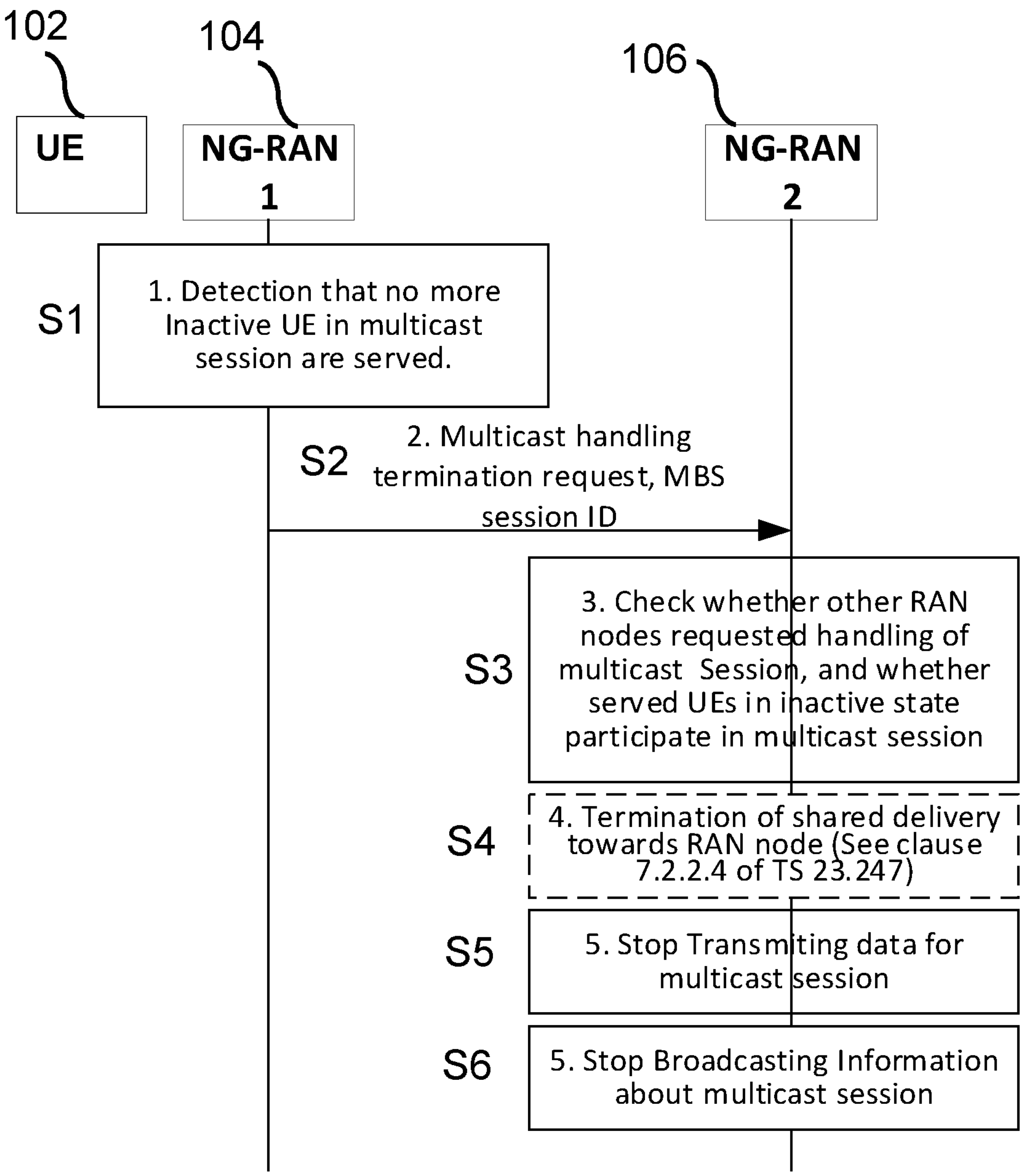

Fig. 2

S1 — Determining a presence of at least one user equipment that is participating in a multicast session while in an inactive state S2 — Determining an area where handling of the multicast session for the at least one user equipment in inactive state is required S3 — Determining one or more nodes handling cells within at least a part of the determined area S4 — In response to the determining a presence of at least one user equipment in inactive state, sending to each determined node a request to handle the multicast session for the at least one user equipment in inactive state

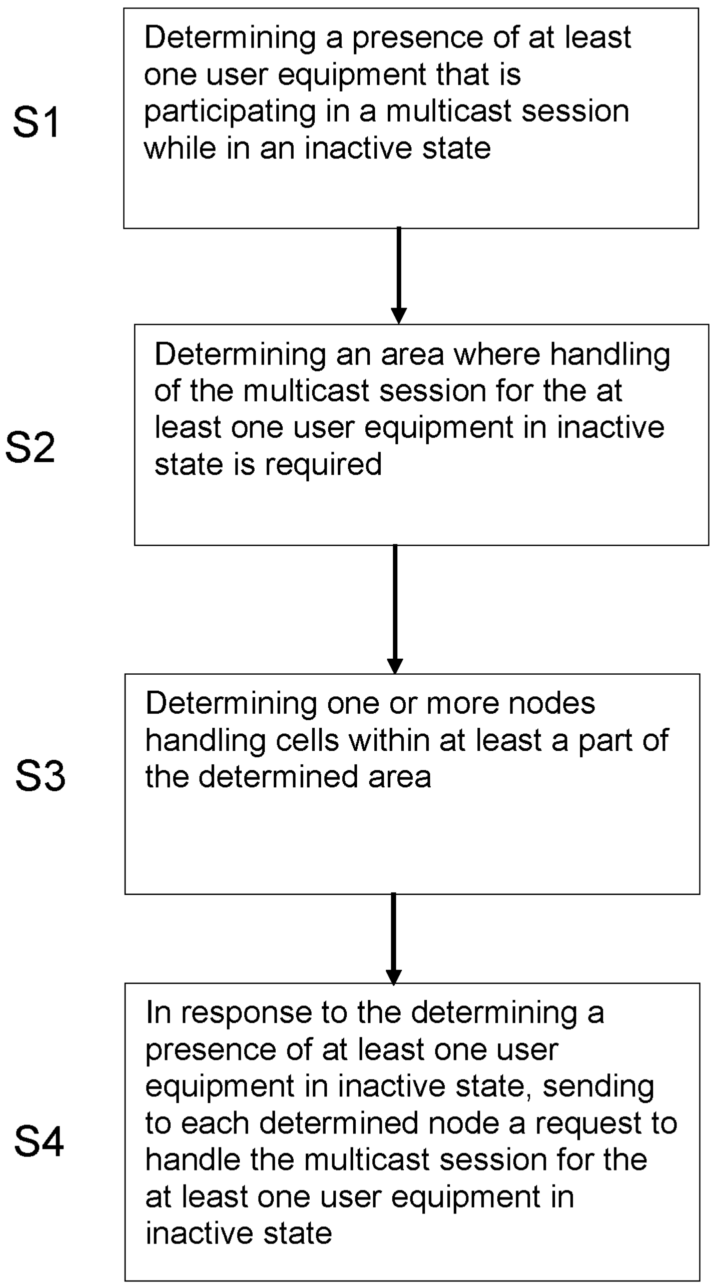

Fig. 7

S1    Based on information received from one or more base stations being managed by the apparatus, determining one or more areas where handling of a multicast session for at least one user equipment in inactive state is required S2    Determining a consolidated area for the handling of the multicast session based on the one or more areas S3    Storing the information of the consolidated area S4    In response to receiving further information from the one or more base stations, updating the stored information of the consolidated area associated with the multicast session S5    Sending at least one notification related to the updated stored information

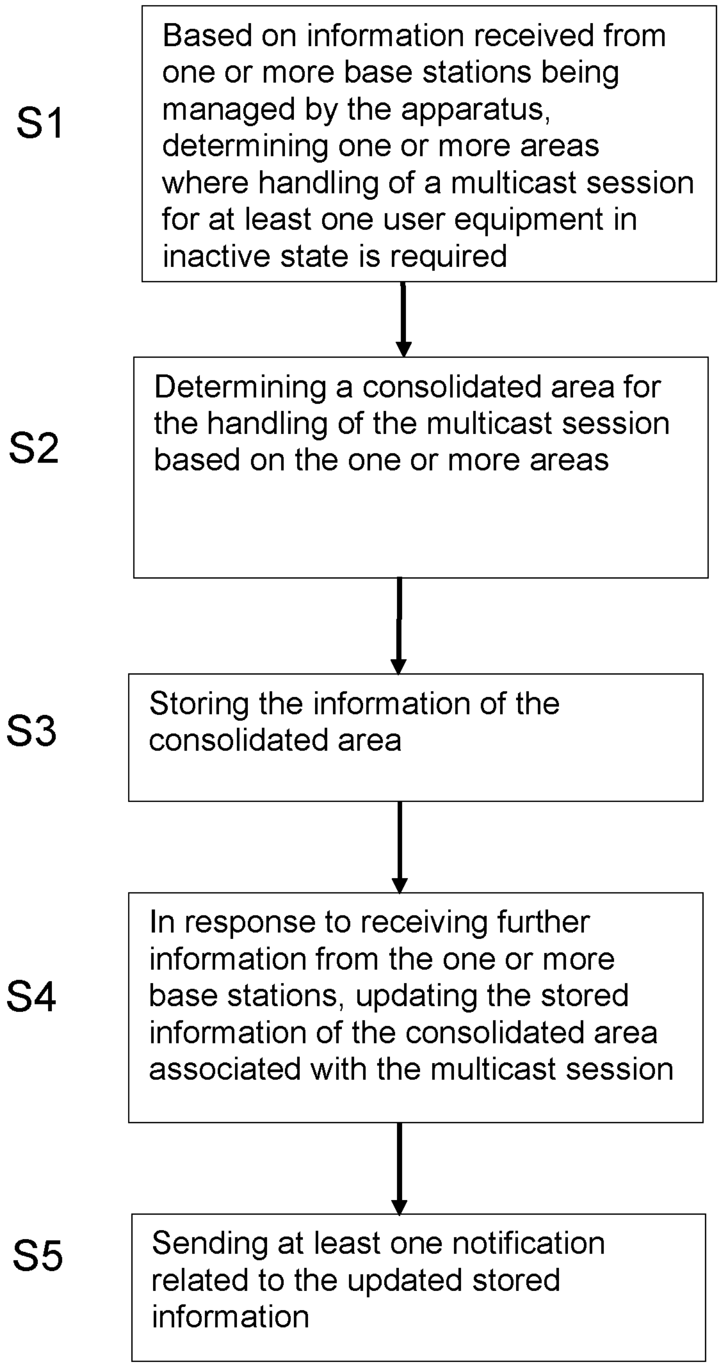

Fig. 8

S1     Receiving at least one request from at least one core network node to handle a multicast session for user equipment in inactive state, the request comprising information of an area for handling the multicast session S2     Storing, in association with the multicast session, identity information of the at least one core network node and the information of an area S3     Determining a local area of the apparatus S4     Within the determined local area, performing local procedures for the handling of the multicast session for user equipment in inactive state

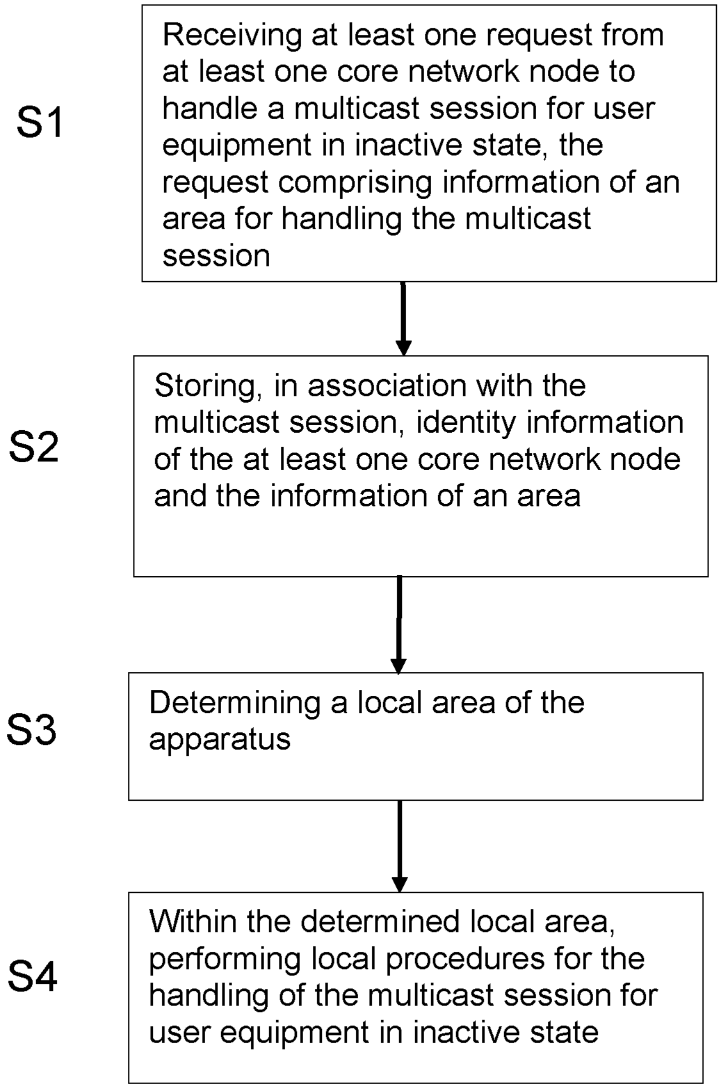

Fig. 9

S1  Receiving at least one request from at least one node to handle a multicast session for user equipment in inactive state, each of the at least one requests comprising information of an area S2  Storing, for each request, an identity of the at least one node that sent the request and the information of the area in the request S3  Determining a local area by combining the received information of areas with information of an area served by the apparatus S4  Within the determined local area, performing local procedures for the handling of the multicast session for user equipment in inactive state

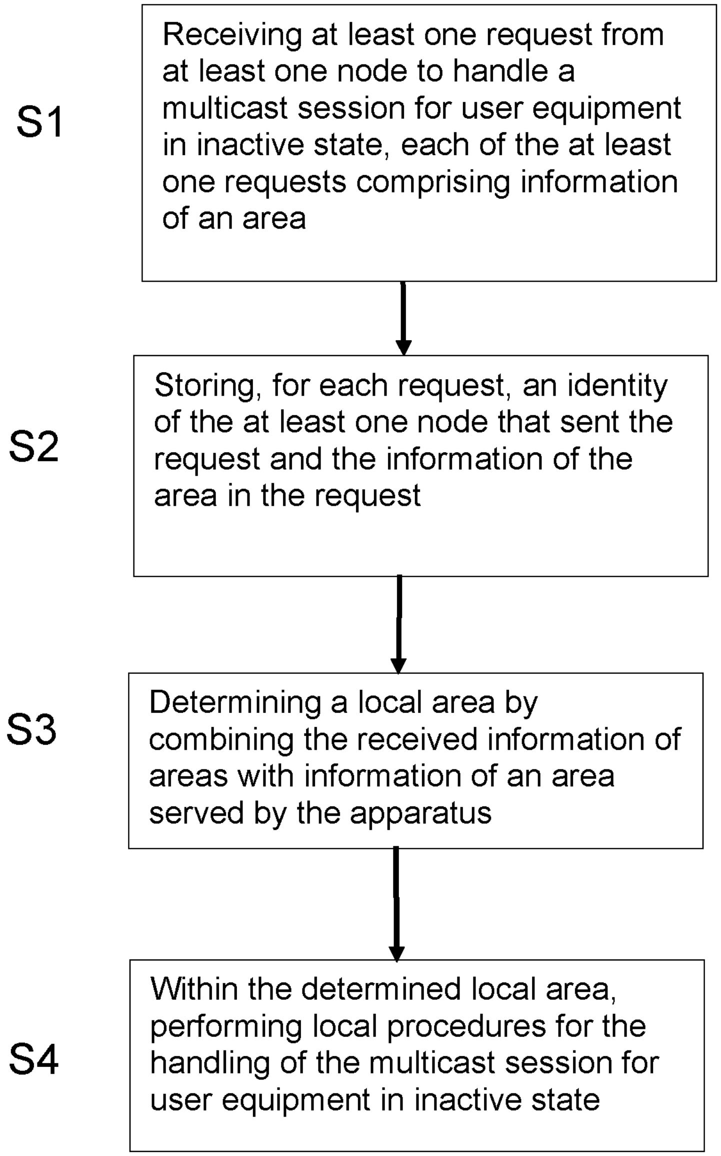

Fig. 10

HANDLING OF MULTICAST SESSIONS

RELATED APPLICATIONS

This application claims the benefit of priority of United Kingdom Patent Application No. 2204462.2, filed Mar. 29, 2022, which is hereby incorporated by reference as if reproduced in its entirety.

FIELD

This disclosure relates to communications. More particularly the present invention relates to apparatus, methods and computer programs for handling multicast session in a communications network.

BACKGROUND

A communication system can be seen as a facility that enables communication between two or more devices such as user terminals, machine-like terminals, base stations and/or other nodes by providing communication channels for carrying information between the communicating devices. A communication system can be provided for example by means of a communication network and one or more compatible communication devices. Communications may comprise, for example, communication of signals for carrying data for voice, electronic mail (email), text message, multimedia and/or content and so on. A communication system can provide services. Non-limiting examples of services provided by a communication system include two-way or multi-way calls, data communication or multimedia services and access to a data network system, such as the Internet.

In a wireless system, such as the communication system described above, at least a part of communications occurs over wireless interfaces. Examples of wireless systems include public land mobile networks (PLMN), satellite based communication systems and different wireless local networks, for example wireless local area networks (WLAN). A wireless networking technology which allows devices to connect to a data network is known by the tradename WiFi (or Wi-Fi). WiFi is often used synonymously with WLAN. The wireless systems can be divided into cells, and are therefore often referred to as cellular networks. A base station provides at least one cell.

A user can access a communication system by means of an appropriate communication device or terminal capable of communicating with a base station. Hence nodes such as base stations are often referred to as access points. A communication device of a user is often referred to as user equipment (UE) or user device. A communication device of a user is provided with an appropriate signal receiving and transmitting apparatus for enabling communications, for example enabling communications with a base station and/or communications directly with other user devices. The communication device of a user can communicate on appropriate channels, e.g., listen to a channel on which a station, for example a base station of a cell, transmits.

A communication system and associated devices typically operate in accordance with a given standard or specification which sets out what the various entities associated with the communication system are permitted to do and how that should be achieved. Communication protocols and/or parameters which shall be used for a connection are also typically defined.

Non-limiting examples of standardised radio access technologies include GSM (Global System for Mobile) and EDGE (Enhanced Data for GSM Evolution). Non-limiting examples of radio access networks include GSM EDGR Radio Access Networks (GERAN), Universal Terrestrial Radio Access Networks (UTRAN) and evolved UTRAN (E-UTRAN).

An example communication system architecture is the long-term evolution (LTE) of the Universal Mobile Telecommunications System (UMTS) radio-access technology. The LTE is standardized by the third Generation Partnership Project (3GPP). The LTE employs the Evolved Universal Terrestrial Radio Access Network (E-UTRAN) and a further development thereof which is sometimes referred to as LTE Advanced (LTE-A).

Since introduction of fourth generation (4G) radio access technology increasing interest has been paid to the next, or fifth generation (5G) radio access technology. 5G may also be referred to as a New Radio (NR). Standardization of 5G or New Radio systems has been finalized in 3GPP release 15.

Data can be broadcast to user devices. Broadcast refers to the ability to deliver content to multiple users in a broadcast area. An example of broadcast services is Multicast and Broadcast Service (MBS) which provides point-to-multipoint communication. Unlike in unicast services, with MBS data can be transmitted simultaneously from a single source to multiple destinations/devices.

In a 5G system, a UE Registration Area (RA) comprises a list of one or more Tracking Areas (TA). A Tracking Area is a logical concept of an area where a UE can move around without updating the network that is serving the UE. The network serving the UE can allocate a list with one or more TAs to the UE.

SUMMARY

According to an aspect there is provided an apparatus comprising means for performing: determining a presence of at least one user equipment that is participating in a multicast session while in an inactive state; determining an area where handling of the multicast session for the at least one user equipment in inactive state is required; determining one or more nodes in cells within at least a part of the determined area for handling data of the multicast session; in response to the determining a presence of at least one user equipment in inactive state, sending to each determined node a request to handle data of the multicast session for the at least one user equipment in inactive state.

According to some examples the determining a presence of at least one user equipment comprises determining a presence of at least one user equipment in a tracking area of the apparatus.

According to some examples, the one or more nodes comprise one or more neighbouring base stations.

According to some examples, the means are further configured to perform the determining an area by combining information of radio access network notification areas of the at least one user equipment to generate information of a combined area, and comparing the information of a combined area with information of a service area of the multicast session, the determined area comprising a region of overlap between the combined area and the service area.

According to some examples, the means are further configured to perform including, in the request sent to each of the one or more nodes, information about at least the part of the determined area that is handled by the determined node.

According to some examples, the information of the determined area comprises one or more of: one or more radio access network area identifiers; a cell list; one or more tracking area identifiers.

According to some examples, the means are further configured to perform determining updates to the determined area, and notifying one or more affected nodes of the one or more nodes about the updated determined area.

According to some examples, determining updates to the determined area is in response to at least one of the following: receiving information of user equipment participating in the multicast session entering or leaving the inactive state; receiving information of user equipment joining or leaving the multicast session; user equipment participating in the multicast session starting or terminating to be served by the apparatus; termination of the multicast session.

According to some examples, when it is determined by the apparatus that a node of the one or more nodes is no longer required to perform the handling of the multicast session for the user equipment in inactive state, the means are further configured to perform instructing the node to terminate the handling of the multicast session for the user equipment in inactive state.

According to some examples, the means are further configured to perform: receiving at least one request from at least one node to handle a multicast session for user equipment in inactive state, each of the at least one requests comprising information of an area; storing, for each request, an identity of the at least one node that sent the request and the information of an area in the request; determine a local area by combining the received information of areas with information of part of the determined local area served by the apparatus; and within the determined local area, performing local procedures for the handling of the multicast session for user equipment in inactive state.

According to some examples, the performing local procedures comprise at least one of: advertising or broadcasting support for the multicast session; transmitting data for the multicast session using a transmission mode for inactive reception; monitoring whether signalling is received in a cell indicating that at least some user equipment in that cell desire to receive the multicast session, and transmitting data for the multicast session in the cell in response to such signalling; establishment of shared delivery of data for the multicast session from the core network towards the apparatus.

According to some examples, the means are further configured to: receive at least one request from at least one of the at least one nodes to terminate the handling of the multicast session for user equipment in inactive state; remove the stored information for that at least one node.

According to some examples, the means are further configured to terminate the local procedures for the handling of the multicast session for the user equipment in inactive state in response to determining that the apparatus has no stored information regarding handling of the multicast session for the user equipment in inactive state.

According to some examples, the apparatus comprises any one of: a base station; a next generation radio node; or a gNB.

According to some examples, the means comprises at least one processor, and at least one memory including computer program code, the at least one memory and computer program code configured to, with the at least one processor, cause the performance of the apparatus.

According to an aspect there is provided an apparatus comprising means for performing: based on information received from one or more base stations being managed by the apparatus, determining one or more areas where handling of a multicast session for at least one user equipment in inactive state is required; determining a consolidated area for the handling of the multicast session based on the one or more areas; storing the information of the consolidated area; and in response to receiving further information from the one or more base stations, updating the stored information of the consolidated area associated with the multicast session; and sending at least one notification related to the updated stored information.

According to some examples, the information received from one or more base stations comprises one or more of: an identifier of at least one multicast session; tracking area of at least one user equipment in inactive state; radio access node notification area of at least one user equipment in inactive state.

According to some examples, the further information comprises information of one or more base stations newly involved in the consolidated area, and the sending at least one notification comprises sending a notification to the one or more base stations to apply local procedures in a determined area of the multicast session.

According to some examples, the further information comprises information identifying one or more base stations no longer involved in the consolidated area, and the sending a notification comprises sending a notification to the one or more base stations to stop applying local procedures in a determined area of the multicast session.

According to some examples, the further information relates to an update of the consolidated area, and the sending a notification comprises sending a notification to the one or more base stations to modify application of local procedures in a determined area of the multicast session.

According to some examples, the determined area comprises the consolidated area or a subset of the consolidated area taking into account service areas of the multicast session and/or tracking areas supported by the one or more base stations.

According to some examples, the information received from one or more base stations comprises an information element comprising status information of one or more user equipment served by the apparatus.

According to some examples, the status information comprises one or more of: information that one or more user equipment served by the apparatus moved to a radio resource control inactive state; information of a radio access node notification area associated to the one or more user equipment or information representing a superset of the radio access node notification area; information of one or more tracking areas of the one or more user equipment.

According to some examples, the consolidated area comprises a merge with a list of tracking areas corresponding to registration areas of one or more user equipment in a connection management idle mode served by the apparatus in which the multicast session is to be provided.

According to some examples, the apparatus comprises an access and mobility management function.

According to some examples, the means comprises at least one processor, and at least one memory including computer program code, the at least one memory and computer program code configured to, with the at least one processor, cause the performance of the apparatus.

According to an aspect there is provided an apparatus comprising means for performing: receiving at least one request from at least one core network node to handle a multicast session for user equipment in inactive state, the request comprising information of an area for handling the multicast session; storing, in association with the multicast session, identity information of the at least one core network node and the information of an area; determining a local area of the apparatus; and within the determined local area, performing local procedures for the handling of the multicast session for user equipment in inactive state.

According to some examples, the determining a local area comprises combining the received information of an area with service area information of the multicast session.

According to some examples, the information of an area comprises one or more of: one or more radio access network area identifiers; a cell list; one or more tracking area identifiers.

According to some examples, the means are further configured to: receive an update from at least one core network node concerning the area for handling of the multicast session; determining an updated local area for handling of the multicast session; and based on the updated local area performing one or more of the following as the local procedures: stopping or starting advertising or broadcasting support for the multicast session where needed; stopping or starting transmitting of data for the multicast session using the transmission mode for inactive reception where needed; stopping or starting monitoring whether signalling is received in a cell indicating that some user equipment in that cell desire to receive the multicast session, and transmitting data for the multicast session in the cell in response to such signalling, where needed; stopping or starting establishment of shared delivery of data for the multicast session from the core network towards the apparatus.

According to some examples the means are further configured to perform: receiving at least one further request from at least one core network node to terminate the handling of a multicast session for user equipment in inactive state; removing the stored information in association with the multicast session for each of the at least one core network nodes; in response to having no stored information about other radio access network nodes or core network nodes and handling no user equipment in inactive state participating in the multicast session, terminating the local procedures for the handling of the multicast session for user equipment in inactive state.

According to some examples, the means are further configured to perform: determining a presence, in an area of the apparatus, of at least one user equipment that is participating in at least one multicast session while in an inactive state; in response to the determining, sending to a core network node a notification that at least one user equipment is in inactive state, wherein the notification comprises identifiers of the at least one multicast session, and one or more tracking areas or the radio access network based notification area of the at least one user equipment.

According to some examples, the determining a presence is related to the user equipment being configured to transition into RRC_INACTIVE state in the apparatus and the notification to core network node is a NGAP INACTIVE TRANSITION REPORT message.

According to some examples, the local procedures comprise one or more of: advertising or broadcasting support for the multicast session; transmitting of data for the multicast session using a transmission mode for inactive reception; monitoring whether signalling is received in a cell indicating that some user equipment in that cell desire to receive the multicast session, and transmitting data for the multicast session in the cell in response to such signalling; and establishment of shared delivery of data for the multicast session from the core network towards the apparatus.

According to some examples, the apparatus comprises any one of: a base station; a next generation radio node; or a gNB.

According to some examples, the means comprises at least one processor, and at least one memory including computer program code, the at least one memory and computer program code configured to, with the at least one processor, cause the performance of the apparatus.

According to an aspect there is provided a method performed by an apparatus, the method comprising: determining a presence of at least one user equipment that is participating in a multicast session while in an inactive state; determining an area where handling of the multicast session for the at least one user equipment in inactive state is required; determining one or more nodes in cells within at least a part of the determined area for handling data of the multicast session; in response to the determining a presence of at least one user equipment in inactive state, sending to each determined node a request to handle data of the multicast session for the at least one user equipment in inactive state.

According to some examples the determining a presence of at least one user equipment comprises determining a presence of at least one user equipment in a tracking area of the apparatus.

According to some examples, the one or more nodes comprise one or more neighbouring base stations.

According to some examples, the method comprises determining an area by combining information of radio access network notification areas of the at least one user equipment to generate information of a combined area, and comparing the information of a combined area with information of a service area of the multicast session, the determined area comprising a region of overlap between the combined area and the service area.

According to some examples the method comprises including, in the request sent to each of the one or more nodes, information about at least the part of the determined area that is handled by the determined node.

According to some examples, the information of the determined area comprises one or more of: one or more radio access network area identifiers; a cell list; one or more tracking area identifiers.

According to some examples, the method comprises determining updates to the determined area, and notifying one or more affected nodes of the one or more nodes about the updated determined area.

According to some examples, determining updates to the determined area is in response to at least one of the following: receiving information of user equipment participating in the multicast session entering or leaving the inactive state; receiving information of user equipment joining or leaving the multicast session; user equipment participating in the multicast session starting or terminating to be served by the apparatus; termination of the multicast session.

According to some examples, when it is determined by the apparatus that a node of the one or more nodes is no longer required to perform the handling of the multicast session for the user equipment in inactive state, the means are further configured to perform instructing the node to terminate the handling of the multicast session for the user equipment in inactive state.

According to some examples, the method comprises receiving at least one request from at least one node to handle a multicast session for user equipment in inactive state, each of the at least one requests comprising information of an area; storing, for each request, an identity of the at least one node that sent the request and the information of an area in the request; determine a local area by combining the received information of areas with information of part of the determined local area served by the apparatus; and within the determined local area, performing local procedures for the handling of the multicast session for user equipment in inactive state.

According to some examples, the performing local procedures comprise at least one of: advertising or broadcasting support for the multicast session; transmitting data for the multicast session using a transmission mode for inactive reception; monitoring whether signalling is received in a cell indicating that at least some user equipment in that cell desire to receive the multicast session, and transmitting data for the multicast session in the cell in response to such signalling; establishment of shared delivery of data for the multicast session from the core network towards the apparatus.

According to some examples, the method comprises: receiving at least one request from at least one of the at least one nodes to terminate the handling of the multicast session for user equipment in inactive state; removing the stored information for that at least one node.

According to some examples, the method comprises terminating the local procedures for the handling of the multicast session for the user equipment in inactive state in response to determining that the apparatus has no stored information regarding handling of the multicast session for the user equipment in inactive state.

According to some examples, the apparatus comprises any one of: a base station; a next generation radio node; or a gNB.

According to an aspect there is provided a method performed by an apparatus, the method comprising: based on information received from one or more base stations being managed by the apparatus, determining one or more areas where handling of a multicast session for at least one user equipment in inactive state is required; determining a consolidated area for the handling of the multicast session based on the one or more areas; storing the information of the consolidated area; and in response to receiving further information from the one or more base stations, updating the stored information of the consolidated area associated with the multicast session; and sending at least one notification related to the updated stored information.

According to some examples, the information received from one or more base stations comprises one or more of: an identifier of at least one multicast session; tracking area of at least one user equipment in inactive state; radio access node notification area of at least one user equipment in inactive state.

According to some examples, the further information comprises information of one or more base stations newly involved in the consolidated area, and the sending at least one notification comprises sending a notification to the one or more base stations to apply local procedures in a determined area of the multicast session.

According to some examples, the further information comprises information identifying one or more base stations no longer involved in the consolidated area, and the sending a notification comprises sending a notification to the one or more base stations to stop applying local procedures in a determined area of the multicast session.

According to some examples, the further information relates to an update of the consolidated area, and the sending a notification comprises sending a notification to the one or more base stations to modify application of local procedures in a determined area of the multicast session.

According to some examples, the determined area comprises the consolidated area or a subset of the consolidated area taking into account service areas of the multicast session and/or tracking areas supported by the one or more base stations.

According to some examples, the information received from one or more base stations comprises an information element comprising status information of one or more user equipment served by the apparatus.

According to some examples, the status information comprises one or more of: information that one or more user equipment served by the apparatus moved to a radio resource control inactive state; information of a radio access node notification area associated to the one or more user equipment or information representing a superset of the radio access node notification area; information of one or more tracking areas of the one or more user equipment.

According to some examples, the consolidated area comprises a merge with a list of tracking areas corresponding to registration areas of one or more user equipment in a connection management idle mode served by the apparatus in which the multicast session is to be provided.

According to some examples, the apparatus comprises an access and mobility management function.

According to an aspect there is provided a method performed by an apparatus, comprising: receiving at least one request from at least one core network node to handle a multicast session for user equipment in inactive state, the request comprising information of an area for handling the multicast session; storing, in association with the multicast session, identity information of the at least one core network node and the information of an area; determining a local area of the apparatus; and within the determined local area, performing local procedures for the handling of the multicast session for user equipment in inactive state.

According to some examples, the determining a local area comprises combining the received information of an area with service area information of the multicast session.

According to some examples, the information of an area comprises one or more of: one or more radio access network area identifiers; a cell list; one or more tracking area identifiers.

According to some examples, the method comprises: receiving an update from at least one core network node concerning the area for handling of the multicast session; determining an updated local area for handling of the multicast session; and based on the updated local area performing one or more of the following as the local procedures: stopping or starting advertising or broadcasting support for the multicast session where needed; stopping or starting transmitting of data for the multicast session using the transmission mode for inactive reception where needed; stopping or starting monitoring whether signalling is received in a cell indicating that some user equipment in that cell desire to receive the multicast session, and transmitting data for the multicast session in the cell in response to such signalling, where needed; stopping or starting establishment of shared delivery of data for the multicast session from the core network towards the apparatus.

According to some examples the method comprises: receiving at least one further request from at least one core network node to terminate the handling of a multicast session for user equipment in inactive state; removing the stored information in association with the multicast session for each of the at least one core network nodes; in response to having no stored information about other radio access network nodes or core network nodes and handling no user equipment in inactive state participating in the multicast session, terminating the local procedures for the handling of the multicast session for user equipment in inactive state.

According to some examples the method comprises: determining a presence, in an area of the apparatus, of at least one user equipment that is participating in at least one multicast session while in an inactive state; in response to the determining, sending to a core network node a notification that at least one user equipment is in inactive state, wherein the notification comprises identifiers of the at least one multicast session, and one or more tracking areas or the radio access network based notification area of the at least one user equipment.

According to some examples, the determining a presence is related to the user equipment being configured to transition into RRC_INACTIVE state in the apparatus and the notification to core network node is a NGAP INACTIVE TRANSITION REPORT message.

According to some examples the local procedures comprise one or more of: advertising or broadcasting support for the multicast session; transmitting of data for the multicast session using a transmission mode for inactive reception; monitoring whether signalling is received in a cell indicating that some user equipment in that cell desire to receive the multicast session, and transmitting data for the multicast session in the cell in response to such signalling; and establishment of shared delivery of data for the multicast session from the core network towards the apparatus.

According to some examples the apparatus comprises any one of: a base station; a next generation radio node; or a gNB.

According to an aspect there is provided a computer program comprising instructions for causing an apparatus to perform at least the following: determining a presence of at least one user equipment that is participating in a multicast session while in an inactive state; determining an area where handling of the multicast session for the at least one user equipment in inactive state is required; determining one or more nodes in cells within at least a part of the determined area for handling data of the multicast session; in response to the determining a presence of at least one user equipment in inactive state, sending to each determined node a request to handle data of the multicast session for the at least one user equipment in inactive state.

According to an aspect there is provided a computer program comprising instructions for causing an apparatus to perform at least the following: based on information received from one or more base stations being managed by the apparatus, determining one or more areas where handling of a multicast session for at least one user equipment in inactive state is required; determining a consolidated area for the handling of the multicast session based on the one or more areas; storing the information of the consolidated area; and in response to receiving further information from the one or more base stations, updating the stored information of the consolidated area associated with the multicast session; and sending at least one notification related to the updated stored information.

According to an aspect there is provided a computer program comprising instructions for causing an apparatus to perform at least the following: receiving at least one request from at least one core network node to handle a multicast session for user equipment in inactive state, the request comprising information of an area for handling the multicast session; storing, in association with the multicast session, identity information of the at least one core network node and the information of an area; determining a local area of the apparatus; and within the determined local area, performing local procedures for the handling of the multicast session for user equipment in inactive state.

According to an aspect there is provided an apparatus comprising means for performing: receiving at least one request from at least one node to handle a multicast session for user equipment in inactive state, each of the at least one requests comprising information of an area; storing, for each request, an identity of the at least one node that sent the request and the information of an area in the request; determine a local area by combining the received information of areas with information of an area served by the apparatus; and within the determined local area, performing local procedures for the handling of the multicast session for user equipment in inactive state.

According to some examples the performing local procedures comprise at least one of: advertising or broadcasting support for the multicast session; transmitting data for the multicast session using a transmission mode for inactive reception; monitoring whether signalling is received in a cell indicating that at least some user equipment in that cell desire to receive the multicast session, and transmitting data for the multicast session in the cell in response to such signalling; establishment of shared delivery of data for the multicast session from the core network towards the apparatus.

According to some examples the means are further configured to: receive at least one request from at least one of the at least one nodes to terminate the handling of the multicast session for user equipment in inactive state; remove the stored information for that at least one node.

According to some examples the means are further configured to terminate the local procedures for the handling of the multicast session for the user equipment in inactive state in response to determining that the apparatus has no stored information regarding handling of the multicast session for the user equipment in inactive state.

According to some examples the apparatus comprises any one of: a base station; a next generation radio node; or a gNB.

According to some examples, the means comprises at least one processor, and at least one memory including computer program code, the at least one memory and computer program code configured to, with the at least one processor, cause the performance of the apparatus.

According to an aspect there is provided a method performed by an apparatus, the method comprising: receiving at least one request from at least one node to handle a multicast session for user equipment in inactive state, each of the at least one requests comprising information of an area; storing, for each request, an identity of the at least one node that sent the request and the information of an area in the request; determine a local area by combining the received information of areas with information of an area served by the apparatus; and within the determined local area, performing local procedures for the handling of the multicast session for user equipment in inactive state.

According to an aspect there is provided a computer program comprising instructions for causing an apparatus to perform at least the following: receiving at least one request from at least one node to handle a multicast session for user equipment in inactive state, each of the at least one requests comprising information of an area; storing, for each request, an identity of the at least one node that sent the request and the information of an area in the request; determine a local area by combining the received information of areas with information of an area served by the apparatus; and within the determined local area, performing local procedures for the handling of the multicast session for user equipment in inactive state.

BRIEF DESCRIPTION OF FIGURES

The invention will now be described in further detail, by way of example only, with reference to the following examples and accompanying drawings, in which:

FIG. 2 is a signalling diagram showing signalling messages according to an example;

FIGS. 7 to 10 are flow charts of methods according to examples;

DETAILED DESCRIPTION

In telecommunications, a registration area (RA) comprises a list of Tracking Areas (TAs) for a UE. A registration area contains one or more TAs in which the UE can be paged. Each TA may comprise one or more cells that are controlled by one or more respective base stations.

The 3rd Generation Partnership Project (3GPP) Technical Specification Group Service and System Aspects (SA) working group (referred to as SA2) has defined 5G multicast and broadcast procedures in TS 23.247. SA2 has agreed a Rel-18 study on enhancements for 5G multicast and broadcast services in TR 23.700-47. One enhancement identified for study was enabling an inactive UE (e.g., a UE in RRC_INACTIVE state) to receive data of the multicast session.

In Rel-17, a "distribution area" of a MBS session is determined by the presence of UEs that joined the multicast session in one or more cells. Therefore the distribution area may be considered an area in which the MBS session is provided by one or more RAN nodes. The distribution area may be further restricted by a service area defined for the MBS session. The service area may be defined as an area in which data of the MBS session is to be broadcast. Then, data of the MBS session is only distributed in cells within that service area.

UE in RRC_IDLE state, or referred to as an idle UE, is defined in 3GPP TS 38.300. An Idle UE is a UE which has no activity and for which a context is kept in Core Network but not in RAN i.e. there is no context for this UE in the base station during this inactivity period.

UE in RRC_INACTIVE state, or referred to as an inactive UE, is defined in 3GPP TS 38.300. An Inactive UE is a UE which has no activity and for which a context is kept in both Core Network and RAN i.e. there is a context for this UE in the base station kept during this inactivity period. This makes resumption of traffic faster and signalling-light.

For inactive UEs (i.e., UE's in a RRC_INACTIVE state) their location is known by a RAN at RNA (RAN based Notification Area) level. However, for inactive UEs their location is not known by a RAN at cell level. UEs can move between cells within an area configured by NG-RAN (the RNA) without notifying NG-RAN of the movement (see TS 38.300). An RNA can be a tracking area or a part of a tracking area, or be denoted by cell IDs.

Some example embodiments are now provided which explain how handling of a multicast session can be accomplished. Two main proposals are discussed in more detail below. It will be understood that unless stated otherwise, features from the proposals may be combined.

Proposal 1

Figure 1:
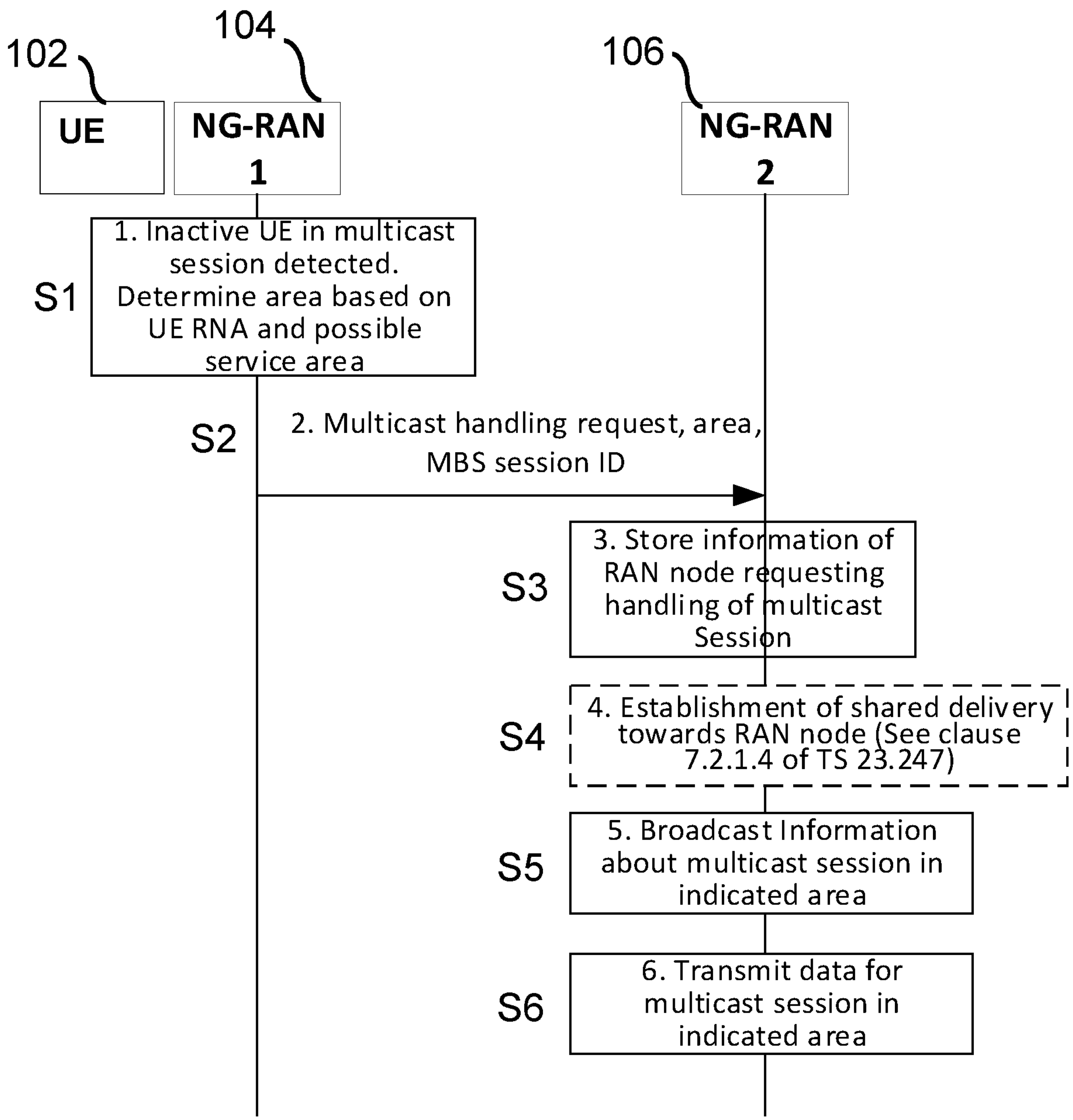
FIG. 1 is a signalling diagram showing signalling messages according to an example.

Proposal 1 is described in more detail with respect to FIG. 1, which shows communication between a first NG-RAN node 104 and a second NG-RAN node 106. For example, the first and second NG-RAN nodes 104, 106 may each comprise a base station. FIG. 1 shows a UE 102 being served by the first NG-RAN node 104. In the example of FIG. 1, the UE 102, the first RAN node 104 and the second RAN node 106 are within the same RNA.

In examples, the UE 102 is served by the first NG RAN node 104 and UE 102 is configured for an inactive-reception enabled multicast session (e.g. reception of data of a multicast session while UE 102 is in RRC_INACTIVE state). When it is detected by RAN node 104 that UE 102 has becomes an inactive UE, the RAN node 104 determines an area where the handling of the multicast session for inactive UEs is required (e.g. the above described "distribution area"). For example, the determining an area where the handling of the multicast session for inactive UEs is required may be based on combining the RNA of all inactive UEs that joined the multicast session that the first RAN node 104 serves, and intersecting or joining that combined area with the possible service area of the multicast session to determine where there is overlap. In other words the determined area may be considered an area which includes both: (i) RNAs for all inactive UEs that joined the multicast session that the first RAN node 104 serves, and (ii) the service area of the multicast session. Then, RAN node 104 determines neighboring RAN nodes (e.g., RAN node 106) within that determined area. This is schematically shown at S1.

The first RAN node 104 then notifies those neighboring RAN nodes (e.g. second RAN node 106) in the RNA that the handling of the multicast session for RRC-Inactive UEs is required. Those neighboring RAN nodes may have no information about the multicast session at this stage, unless they are already serving UEs that joined the multicast session. Further, procedures are required to be executed in all cells where inactive UEs can be located to enable those inactive UEs to receive the data of the multicast session. This contrasts with transmission of data of the multicast session toward UEs in RRC-connected state, where the location of those connected UEs is known at cell level (and therefore procedures for the transmission of data of the multicast session are only executed in cells where UEs that joined the multicast session are located). The first RAN node 104 may provide information to the neighbouring RAN nodes. For example, the first RAN node 104 may provide information about the area where handling of a multicast session is required. The information provided by the first RAN node 104 to neighbouring RAN nodes may comprise one or more of: RAN area ID; cell-list; MBS session ID. According to some examples, information is provided by the first RAN node 104 to neighboring RAN nodes in a multicast handling request. This is shown at S2.

The second RAN node 106 then stores information about the RAN node the multicast handling of a multicast session and the area e.g. stores information about RAN node 104. This is shown at S3. The RAN node 106 determines a local area where the handling of a multicast session for RRC-Inactive UEs is required by combining the area received from the first RAN node 104 with possible areas received from other RAN nodes for the multicast session, and an area determined based on inactive UEs served by the RAN node 106.

A RAN node receiving request for handling of a multicast session for inactive UEs, such as the second RAN node 106, can then do at least one of the following in cells within the determined local area:

(i) Advertise or broadcast support for the multicast session in the indicated area. This is shown at S5.

(ii) Transmit data of the multicast session using the transmission mode for inactive reception. This is shown at S6. In some examples, RAN node 106 will start transmitting data of the multicast session immediately after receiving the multicast handling request at S2.

(iii) Monitor whether signaling is received in a cell within the indicated area indicating that some UEs in that cell desire to receive the data of the multicast session. For instance such signaling may comprise preambles received from inactive UEs. The second RAN node 106 then starts the transmission of data of the multicast session when receiving such signalling.

(iv) Optionally, establishment of shared delivery of data of the multicast session from the core network towards itself (i.e. towards the first RAN node 106) is requested by RAN node 106 if it has not yet done so (e.g. due to the presence of connected UEs (i.e. UEs in the RRC_CONNECTED state) within the multicast session). This is schematically shown at S4. For example, the second RAN node 106 sends a request to AMF. The AMF may forward the request to MB-SMF. Therefore shared delivery of data may be considered, in other words, as delivery of data from the core network towards the RAN node(s).

(v) According to some examples, the RAN (e.g., the second RAN node 106) does not request termination of the shared delivery of data of the multicast session when a last connected UE leaves the RAN node 106.

In examples the first RAN node 104 monitors for one or more of: whether UEs participating in the multicast session enter or leave the inactive state; whether UEs join or leave the multicast session; whether UEs participating in the multicast session are no longer served or start to be served by the first RAN node 104, e.g. due to handovers of such UEs; whether the multicast session is terminated. The first RAN node 104 may then update the determined area where the handling of a multicast session for RRC-Inactive UEs is required based on those events. When changes of the determined area affect the part of the area served by another RAN node such as RAN node 106, the first RAN node 104 notifies the other RAN node 106 about the changed area. The first RAN node 104 also notifies any other affected RAN node(s) if that RAN node(s) is no longer within the determined area, as discussed in more detail in FIG. 2.

FIG. 2 shows a situation where no more inactive UEs in the multicast session are served. In some examples, the steps of FIG. 2 may follow the steps of FIG. 1.

At S1, first RAN node 104 detects that there are no more inactive UEs in the multicast session being served in the determined area. For example, RAN node 104 may determine that the last UE served by the NG RAN node 104 within an inactive-reception enabled multicast session returns to RRC-active state or leaves the multicast session or the RNA.

At S2, RAN node 104 notifies any RAN nodes (e.g., RAN node 106) where it had previously sent a request to handle the multicast session for RRC-Inactive UEs that handling of the multicast session for RRC-Inactive UEs is no longer required. For example, this may be considered a multicast handling termination request message. In some examples, the message may comprise information of one or more of: RNA; MBS session ID.

At S3, neighbour RAN node 106 removes the stored information about the RAN that requested the termination of the handling (e.g., removes stored information about RAN 104) and determines a new local area. RAN 106 checks whether all RAN nodes (e.g., RAN node 104) that previously requested the handling of the multicast session within the area also requested termination of the handling of the multicast session. If all other such RAN node(s) (e.g., RAN node 104) did request termination, the RAN node 106 stops handling of the multicast session for RRC-Inactive UEs. RAN 106 may also request the termination of shared delivery. For example, RAN 106 sends a request for termination of shared delivery to AMF. In some examples, RAN node 106 does this unless RRC-Connected UEs within the multicast session are present within those cells, since those UEs still require the session to be delivered.

Termination of shared delivery is shown at S4.

As shown at S5, RAN node 106 stops transmitting data for the multicast session in the indicated area.

Also, as shown at S6, RAN node 106 stops broadcasting information about the multicast session in the indicated area.

Proposal 2

In proposal 2 there are two primary example embodiments, discussed in turn below.

Example Embodiment 1

Figure 3:
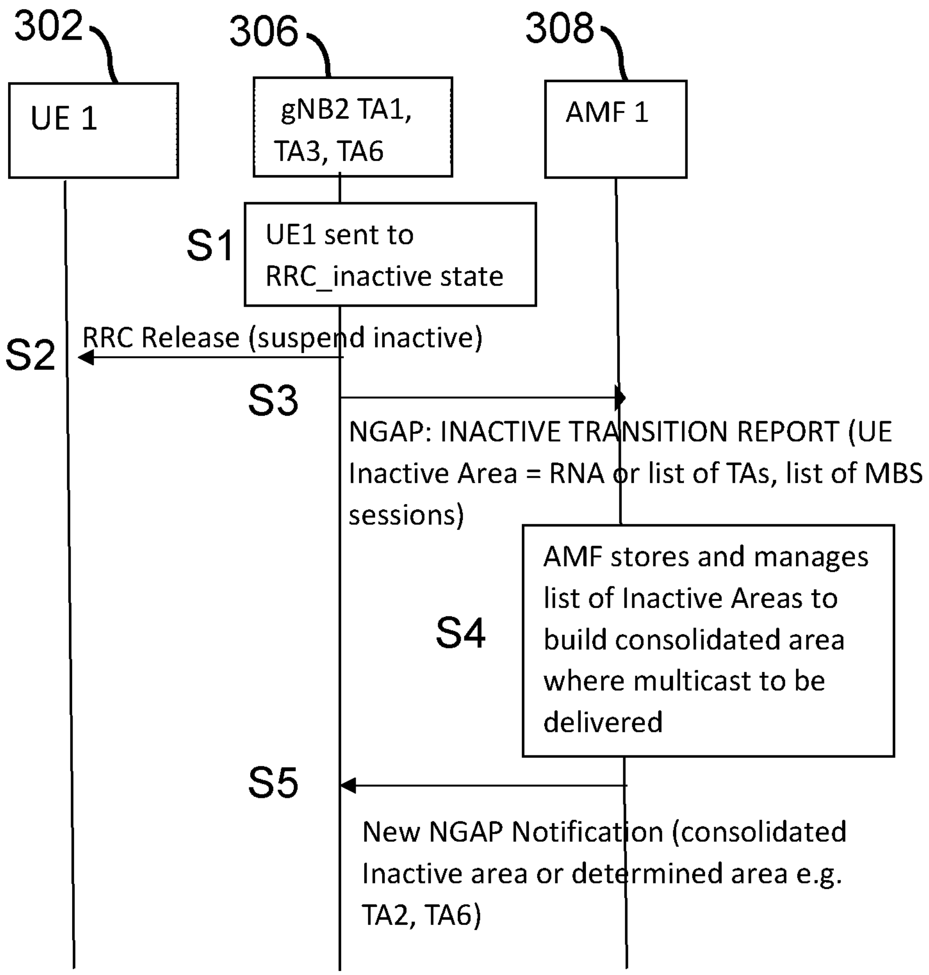
FIG. 3 is a signalling diagram showing signalling messages according to an example.

This example embodiment relates to a situation where a UE is sent to RRC_inactive state. Reference is made to FIG. 3 which is a signaling diagram showing communication between a UE 302, a RAN node or gNB 306, and an access and mobility management function 308. In the example of FIG. 3, gNB 306 controls tracking areas TA1, TA3, and TA6.

At S1, gNB 306 sends UE 302 to an RRC_Inactive state.

At S2, gNB 306 sends an RRC Release (suspend inactive) message to UE 302.

At S3, gNB 306 sends to AMF 308 an inactivity report. In some examples, the inactivity report comprises a NGAP: INACTIVE TRANSITION REPORT. In some examples, the inactivity report comprises an information element (IE) relating to inactivity information. In some examples this IE comprises a "UE Inactive Area" IE. In some examples the IE comprises one or more of: RNA of the UE 302; a list of TAs comprising the RNA (e.g., TA1, TA3, TA6 in this example); list of MBS sessions the UE 302 has joined; status of the MBS sessions the UE 302 has joined.

As shown at S4, the AMF 308 manages information of inactive areas. For example, AMF 308 may manage a list of inactive areas. The AMF 308 may do this in a fashion similar to how the AMF 308 would manage a list of idle TAs for RRC idle UEs. In some examples, the AMF 308 uses the received Inactive Area IE to determine a "Consolidated Inactive area" list. In some examples the consolidated inactive area list comprises a list of TAs or a list of cells where the multicast session is to be delivered. In some examples the inactive area list is considered "consolidated" because AMF 308 may have received inactivity IEs from multiple gNBs, and has consolidated that information.

As shown at S5, the AMF 308 sends the consolidated inactive area list to gNB 306. In some examples, the list is sent in an NGAP Idle distribution message. The consolidated list gives the gNB 306 a full or fuller picture of the inactive areas, compared to the information gNB 306 would have been able to obtain on its own.

The gNB (e.g. gNB 306) receiving the consolidated inactive area list for a multicast session can then do at least one of the following in cells within the consolidated inactive area list:

(i) Advertise or broadcast support for the multicast session in the indicated area. (Similar to S5 of FIG. 1).

(ii) Transmit data for the multicast session using a transmission mode for inactive reception. In some examples, gNB (e.g. gNB 306) will start the transmission of data immediately after receiving the consolidated inactive area list.

(iii) Monitor whether signaling is received in a cell within the consolidated inactive area list indicating that some UEs in that cell desire to receive the multicast session. For instance such signaling may comprise preambles received from UEs. gNB 306 then starts the transmission of data for the multicast session when receiving such signalling.

(iv) Optionally, establishment of shared delivery of data for the multicast session from the core network towards itself (i.e. towards gNB 306) is requested if it has not yet done so (e.g. due to the presence of connected UEs within the multicast session).

(v) According to some examples, the RAN does not request termination of the shared delivery for the multicast session when a last connected UE leaves the RAN node.

Example Embodiment 2

Figure 4:
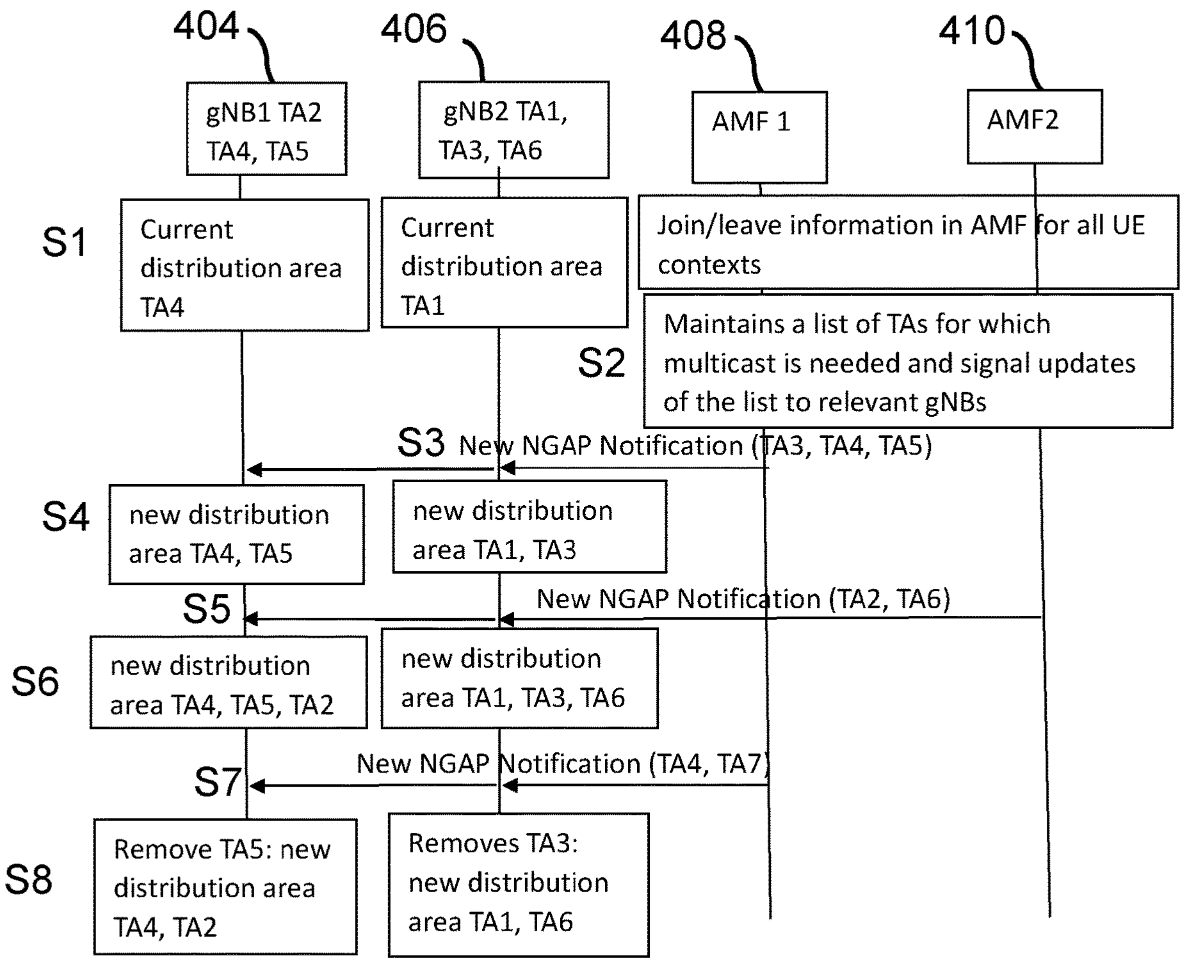
FIG. 4 is a signalling diagram showing signalling messages according to an example.

Example embodiment 2 is explained with reference to FIG. 4 which shows communication between a first RAN node (e.g. gNB 404) and a second RAN node (e.g. gNB 406), and a first AMF 408 and a second AMF 410.

As shown at S1, gNB 404 stores information of a current area of the gNB 404 that is handling data of a multicast session (e.g., distribution area). gNB 406 stores information of a current area of gNB 406 that is handling data of a multicast session (e.g. distribution area). In the example of FIG. 4, at S1 the current distribution area for gNB 404 is TA4, and the current distribution area for gNB 406 is TA1. Also, the first and second AMFs 408 and 410 store joining information for all UEs (e.g. information of UEs that join or leave the multicast session) that the AMF manages and the registration area (RA) of each of the UEs.

As shown at S2 the first and second AMFs 408 and 410 each store, for idle UEs (i.e., UEs in the RRC_IDLE state) handled by the respective AMFs 408 and 410, a list of TAs for which data of a multicast session is to be delivered.

The first and second AMFs 408, 410 then provide to the gNBs (e.g., gNB 404 and gNB 406) a list of those TAs in which there are idle UEs requiring the data of the multicast session. In some examples this list of TAs is provided in an NGAP notification, as shown at S3. By way of example only, in FIG. 4 it is shown that TA3, TA4 and TA5 form such TAs.

S4 shows an instance where there is an update of TAs for gNB 404 and gNB 406. In the example of FIG. 4, at S4 the distribution area for gNB 404 changes from TA4 to TA4 and TA5. Also, the distribution area for gNB 406 changes from TA1 to TA1 and TA3. As mentioned previously, the first AMF 408 and the second AMF 410 will update/maintain their list of TAs as appropriate with respect to this change.

Then, as shown at S5, the AMF (in this case the first AMF 410) provides a new NGAP notification to the gNBs 404 and 406.

S6 and S7 are similar to S4 and S5. Generally, it may be considered that every time an update of the distribution list impacts a gNB, the AMF sends a new NGAP notification to affected gNBs. In some examples, the NGAP notification comprises one or more of: multicast session information; area session ID; list of TAs; service area information; session active/inactive information) to the relevant gNBs.

Moreover, for each TA a gNB manages, the gNB determines for all active multicast sessions at any time a TA distribution status as follows:

If the TA belongs to at least one of the last received list from a connected AMF, TA distribution status=delivery of multicast service If the TA does not belong to any list received by any connected AMF, set the TA distribution status=no delivery of multicast service As shown at S8, when gNB 404 and gNB 406 remove a TA from their list of TAs, the gNB 404 and gNB 406 update their distribution list accordingly. When a gNB adds a new TA to its list of TAs, the gNB 404 and gNB 406 update their distribution list accordingly. In other words, the gNB is configured to update its distribution list to account for added and/or removed TAs.

It will be understood that example embodiments may enable support of a higher number of UEs in a multicast session via inactive/idle mode reception, while maintaining backward compatibility with Rel-17 and providing application control of the service implications.

Figure 5:
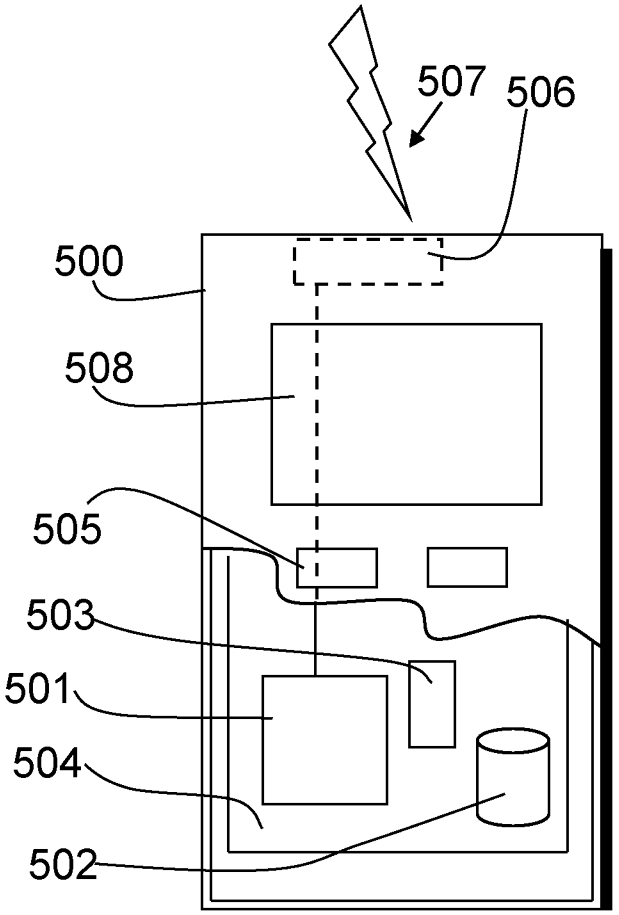
FIG. 5 shows an example of a communication device.

A wireless communication device will now be described in more detail with reference to FIG. 5 showing a schematic, partially sectioned view of a wireless communication device 500. Such a wireless communication device is often referred to as user equipment (UE) or terminal. An appropriate mobile communication device may comprise any device capable of sending and receiving radio signals. Non-limiting examples of a mobile communication device comprise a mobile station (MS) or mobile device such as a mobile phone or what is known as a 'smart phone', a computer provided with a wireless interface card or other wireless interface facility (e.g., USB dongle), personal data assistant (PDA) or a tablet provided with wireless communication capabilities, or any combinations of these or the like. A mobile communication device may provide, for example, communication of data for carrying communications such as voice, electronic mail (email), text message, multimedia and so on. Users may thus be offered and provided numerous services via their communication devices. Non-limiting examples of services offered and provided to users by a mobile communication device comprise two-way or multi-way calls, data communication or multimedia services or simply an access to a data communications network system, such as the Internet. A mobile communication device may also be provided with broadcast or multicast data. Non-limiting examples of the content of broadcast or multicast data comprise downloads, television and radio programs, videos, advertisements, various alerts and other information.

A wireless communication device may be for example a mobile device, that is, a device not fixed to a particular location, or it may be a stationary device. The wireless communication device may need human interaction for communication, or may not need human interaction for communication. In the present teachings the terms UE or "user" are used to refer to any type of wireless communication device.

The wireless communication device 500 may receive signals over an air or radio interface 507 via appropriate apparatus for receiving and may transmit signals via appropriate apparatus for transmitting radio signals. In FIG. 5 transceiver apparatus is designated schematically by block 506. The transceiver apparatus 506 may be provided for example by means of a radio part and associated antenna arrangement. The antenna arrangement may be arranged internally or externally to the wireless device.

A wireless device is typically provided with at least one data processing entity 501, at least one memory 502 and other possible components 503 for use in software and hardware aided execution of tasks it is designed to perform, including control of access to and communications with access systems and other communication devices. The data processing, storage and other relevant control apparatus can be provided on an appropriate circuit board and/or in chipsets. This feature is denoted by reference 504. The user may control the operation of the wireless device by means of a suitable user interface such as key pad 505, voice commands, touch sensitive screen or pad, combinations thereof or the like. A display 508, a speaker and a microphone can be also provided. Furthermore, a wireless communication device may comprise appropriate connectors (either wired or wireless) to other devices and/or for connecting external accessories, for example hands-free equipment, thereto.

Figure 6:
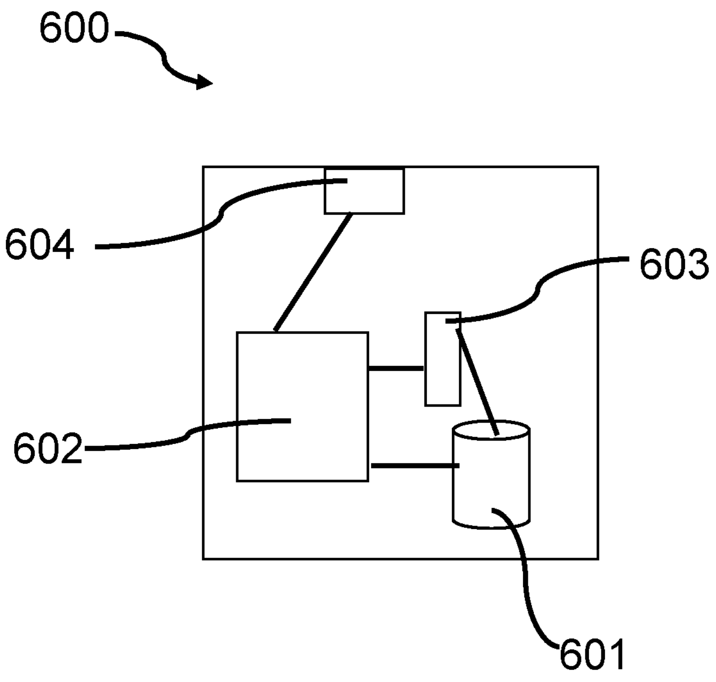
FIG. 6 shows an example of a control apparatus.

FIG. 6 shows an example of a control apparatus for a communication system, for example to be coupled to and/or for controlling a station of an access network, such as a RAN node, e.g. a base station, gNB (e.g. gNB 204, 304, 404) of a RAN, a central unit of a cloud architecture or a node of a core network such as an MME or S-GW, a scheduling entity such as a spectrum management entity, or a server or host, or a network function of a core network such as an AMF (e.g. 206, 306, 406). The control apparatus may be integrated with or external to a core network or a RAN node. In some embodiments, RAN nodes comprise the control apparatus. In other embodiments, the control apparatus can be another network element such as a radio network controller or a spectrum controller. In some embodiments, each RAN node may have such a control apparatus as well as a control apparatus being provided in a radio network controller. The control apparatus 600 can be arranged to provide control on communications in the service area of the system. The control apparatus 600 comprises at least one memory 601, at least one data processing unit 602, 603 and an input/output interface 604. Via the interface the control apparatus can be coupled to a receiver and a transmitter of the base station. The receiver and/or the transmitter may be implemented as a radio front end or a remote radio head. For example the control apparatus 600 or processor 601 can be configured to execute an appropriate software code to provide the control functions.

FIGS. 7 to 10 are flow charts of methods according to examples.

FIG. 7 is a flow chart of a method viewed from the perspective of an apparatus. For example, the apparatus may comprise a RAN node. For example, the apparatus may comprises a base station or gNB.

As shown at S1 the method comprises determining a presence of at least one user equipment that is participating in a multicast session while in an inactive state.

At S2 the method comprises determining an area where handling of the multicast session for the at least one user equipment in inactive state is required.

At S3 the method comprises determining one or more nodes in cells within at least a part of the determined area for handling data of the multicast session.

At S4 the method comprises in response to the determining a presence of at least one user equipment in inactive state, sending to each determined node a request to handle the multicast session for the at least one user equipment in inactive state.

FIG. 8 is a flow chart of a method viewed from the perspective of an apparatus. For example, the apparatus may comprise a network node. For example, the apparatus may comprise an AMF.

At S1 the method comprises, based on information received from one or more base stations being managed by the apparatus, determining one or more areas where handling of a multicast session for at least one user equipment in inactive state is required.

At S2 the method comprises determining a consolidated area for the handling of the multicast session based on the one or more areas.

At S3 the method comprises storing the information of the consolidated area.

At S4 the method comprises, in response to receiving further information from the one or more base stations, updating the stored information of the consolidated area associated with the multicast session.

At S5 the method comprises sending at least one notification related to the updated stored information.

FIG. 9 is a flow chart of a method viewed from the perspective of an apparatus. For example, the apparatus may comprise a RAN node. For example, the apparatus may comprise a base station or gNB.

As shown at S1 the method comprises receiving at least one request from at least one core network node to handle a multicast session for user equipment in inactive state, the request comprising information of an area for handling the multicast session.

At S2 the method comprises storing, in association with the multicast session, identity information of the at least one core network node and the information of an area.

At S3 the method comprises determining a local area of the apparatus.

At S4 the method comprises, within the determined local area, performing local procedures for the handling of the multicast session for user equipment in inactive state.

FIG. 10 is a flow chart of a method viewed from the perspective of an apparatus. For example, the apparatus may comprise a RAN node. For example, the apparatus may comprise a base station or gNB.

As shown at S1 the method comprises receiving at least one request from at least one node to handle a multicast session for user equipment in inactive state, each of the at least one requests comprising information of an area.

At S2 the method comprises storing, for each request, an identity of the at least one node that sent the request and the information of an area in the request.

At S3, the method comprises determining a local area by combining the received information of areas with information of an area served by the apparatus.

At S4 the method comprises, within the determined local area, performing local procedures for the handling of the multicast session for user equipment in inactive state.

Figure 11:
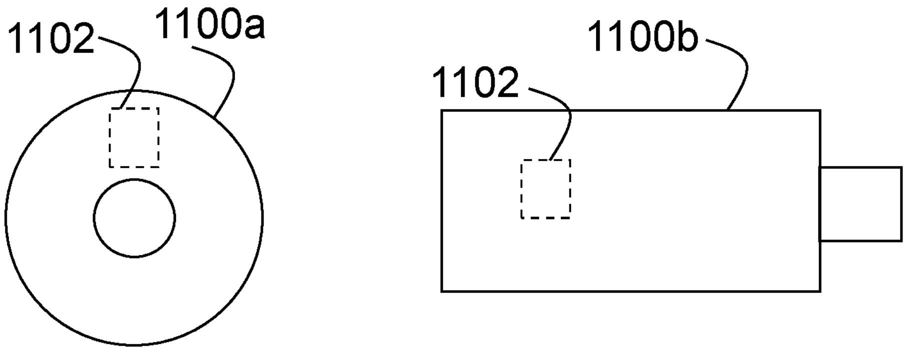
FIG. 11 shows a schematic representation of a non-volatile memory medium storing instructions which when executed by a processor allow a processor to perform one or more of the steps of the methods of some embodiments.

FIG. 11 shows a schematic representation of non-volatile memory media 1100*a* (e.g., computer disc (CD) or digital versatile disc (DVD)) and 1100*b* (e.g., universal serial bus (USB) memory stick) storing instructions and/or parameters 1102 which when executed by a processor allow the processor to perform one or more of the steps of the methods of FIGS. 7 to 10.

In general, the various embodiments may be implemented in hardware or special purpose circuits, software, logic or any combination thereof. Some aspects of the invention may be implemented in hardware, while other aspects may be implemented in firmware or software which may be executed by a controller, microprocessor or other computing device, although the invention is not limited thereto. While various aspects of the invention may be illustrated and described as block diagrams, flow charts, or using some other pictorial representation, it is well understood that these blocks, apparatus, systems, techniques or methods described herein may be implemented in, as non-limiting examples, hardware, software, firmware, special purpose circuits or logic, general purpose hardware or controller or other computing devices, or some combination thereof.

As used in this application, the term "circuitry" may refer to one or more or all of the following: (a) hardware-only circuit implementations (such as implementations in only analog and/or digital circuitry) and (b) combinations of hardware circuits and software, such as (as applicable): (i) a combination of analog and/or digital hardware circuit(s) with software/firmware and (ii) any portions of hardware processor(s) with software (including digital signal processor(s)), software, and memory(ies) that work together to cause an apparatus, such as a mobile phone or server, to perform various functions) and (c) hardware circuit(s) and or processor(s), such as a microprocessor(s) or a portion of a microprocessor(s), that requires software (e.g., firmware) for operation, but the software may not be present when it is not needed for operation. This definition of circuitry applies to all uses of this term in this application, including in any claims. As a further example, as used in this application, the term circuitry also covers an implementation of merely a hardware circuit or processor (or multiple processors) or portion of a hardware circuit or processor and its (or their) accompanying software and/or firmware. The term circuitry also covers, for example and if applicable to the particular claim element, a baseband integrated circuit or processor integrated circuit for a mobile device or a similar integrated circuit in server, a cellular network device, or other computing or network device.

The embodiments of this invention may be implemented by computer software executable by a data processor of the mobile device, such as in the processor entity, or by hardware, or by a combination of software and hardware. Computer software or program, also called program product, including software routines, applets and/or macros, may be stored in any apparatus-readable data storage medium and they comprise program instructions to perform particular tasks. A computer program product may comprise one or more computer-executable components which, when the program is run, are configured to carry out embodiments. The one or more computer-executable components may be at least one software code or portions of it.

Further in this regard it should be noted that any blocks of the logic flow as in the Figures may represent program steps, or interconnected logic circuits, blocks and functions, or a combination of program steps and logic circuits, blocks and functions. The software may be stored on such physical media as memory chips, or memory blocks implemented within the processor, magnetic media such as hard disk or floppy disks, and optical media such as for example DVD and the data variants thereof, CD. The physical media is a non-transitory media.

The memory may be of any type suitable to the local technical environment and may be implemented using any suitable data storage technology, such as semiconductor based memory devices, magnetic memory devices and systems, optical memory devices and systems, fixed memory and removable memory. The data processors may be of any type suitable to the local technical environment, and may comprise one or more of general purpose computers, special purpose computers, microprocessors, digital signal processors (DSPs), application specific integrated circuits (ASIC), FPGA, gate level circuits and processors based on multi core processor architecture, as non-limiting examples.

Embodiments of the inventions may be practiced in various components such as integrated circuit modules. The design of integrated circuits is by and large a highly automated process. Complex and powerful software tools are available for converting a logic level design into a semiconductor circuit design ready to be etched and formed on a semiconductor substrate.

The foregoing description has provided by way of non-limiting examples a full and informative description of the exemplary embodiment of this invention. However, various modifications and adaptations may become apparent to those skilled in the relevant arts in view of the foregoing description, when read in conjunction with the accompanying drawings and the appended claims. However, all such and similar modifications of the teachings of this invention will still fall within the scope of this invention as defined in the appended claims. Indeed there is a further embodiment comprising a combination of one or more embodiments with any of the other embodiments previously discussed.

We claim:

1. A radio access network node (RAN) for a communication network, the RAN node comprising:

at least one processor; and at least one memory storing instructions which, when executed by the at least one processor, cause the RAN node to at least perform:

detecting that at least one inactive user equipment that is served by the RAN node is participating in a multicast session;

determining a distribution area of the multicast session, wherein the distribution area is an area where handling of the multicast session for the at least one inactive user equipment is required, wherein the determining the distribution area comprises:

combining information about radio access network notification areas of respective inactive user equipment of the at least one inactive user equipment to generate information about a combined area;

comparing the information about the combined area with information about a service area for the multicast session to determine a region of overlap between the combined area and the service area; and setting the distribution area to the region of overlap;

determining one or more neighbour RAN nodes of the RAN node handling cells within at least a part of the distribution area of the multicast session; and sending to each respective neighbour RAN node of the one or more neighbour RAN nodes, a respective request to perform handling of the multicast session for the at least one inactive user equipment, each respective request comprising information about the distribution area of the multicast session.

2. The RAN node according to claim 1, wherein the information about the distribution area comprises at least one of: an identifier of radio access network node notification area (RNA); a cell list comprising identifiers of cells of the RNA; or one or more tracking area identifiers identifying one or more tracking areas of the RNA.

3. The RAN node according to claim 1, wherein the at least one memory stores further instructions which, when executed by the at least one processor, cause causes the apparatus to perform;

determining an updated distribution area;

determining which ones of the one or more neighbour RAN nodes are handling cells within at least a part of the updated distribution area of the multicast session; and notifying the ones of the one or more neighbour RAN nodes of information about the updated distribution area of the multicast session.

4. The RAN node according to claim 3, wherein the determining the updated distribution area is in response to at least one of the following:

receiving information indicating that a user equipment participating in the multicast session is entering an inactive state;

receiving information indicating that an inactive user equipment of the at least one inactive user equipment is leaving an inactive state;

receiving information indicating that an inactive user equipment is joining the multicast session;

receiving information indicating that an inactive user equipment of the at least one inactive user equipment is leaving the multicast session;

detecting that an inactive user equipment participating in the multicast session is starting to be served by the RAN node or is terminating to be served by the RAN node;

detecting termination of the multicast session.

5. The RAN node according to claim 1, wherein the at least one memory stores further instructions which, when executed by the at least one processor, cause the RAN node to perform:

after determining that a neighbour RAN node of the one or more neighbour nodes is no longer required to perform the handling of the multicast session for the at least one inactive user equipment, instructing the neighbour RAN node to terminate performing the handling of the multicast session for the at least one inactive user equipment.

6. The RAN node according to claim 1, wherein the at least one memory stores further instructions which, when executed by the at least one processor causes the RAN node to perform:

receiving, from a neighbour RAN node of the one or more neighbour RAN nodes, a request to perform handling of a second multicast session for inactive user equipment served by the neighbour RAN that is participating the second multicast session the request comprising information about a second distribution area of the second multicast session;

storing an identity of the neighbour RAN that sent the request and the information about the second distribution area;

determining a local area of the RAN node in which local procedures are to be performed for performing handling of the second multicast session by combining the information about the second distribution area of the second multicast session with information about an area determined based on at least one inactive user equipment that is served by the RAN node; and performing, in the local area that is determined, the local procedures for the handling of the second multicast session for the inactive user equipment that are served by the RAN node and participating in the second multicast session.

7. The RAN node according to claim 6, wherein the performing local procedures comprises at least one of:

advertising or broadcasting support for performing the handling of the second multicast session;

transmitting data of the second multicast session using a transmission mode for inactive reception;

receiving signalling in a cell of the second distribution area, the signalling indicating that an inactive user equipment of the at least one inactive user equipment that is in the cell desires to receive data of the second multicast session; and transmitting data of the second multicast session in the cell; or delivering data of the second multicast session received from the core network towards the at least one inactive user equipment.

8. The RAN node according to claim 6, wherein the at least one memory stores further instructions which, when executed by the at least one processor, cause the RAN node to perform:

receiving, from at least one neighbour RAN of the one or more neighbour RAN nodes, a request to terminate the performing of the handling of the multicast session for the at least one inactive user equipment;

removing the information identifying the second distribution area that is stored.

9. The RAN node according to claim 6, wherein the RAN node comprises any one of: a base station; a next generation radio access node; or a gNB.

10. A method comprising:

detecting, by a radio access network (RAN) node, that at least inactive one user equipment that is served by the RAN node is participating in a multicast session;

determining, by the RAN node, a distribution area of the multicast session, wherein the distribution area is an area where handling of the multicast session for the at least one inactive user equipment is required, wherein the determining the distribution area comprises:

combining information about radio access network notification areas of respective user equipment of the at least one inactive user equipment to generate information about a combined area;

comparing the information about the combined area with information about a service area for the multicast session to determine a region of overlap between the combined area and the service area; and setting the distribution area to the region of overlap;

determining, by the RAN node, one or more neighbour RAN nodes of the RAN node that control cells within at least a part of the distribution area of the multicast session;

sending to each respective neighbour RAN node of the one or more neighbour RAN nodes, a respective request to handle the multicast session for the at least one inactive user equipment, each respective request comprising information about the distribution area of the multicast session.

* * * * *